United States Patent
Riggin et al.

(10) Patent No.: US 9,672,069 B2
(45) Date of Patent: Jun. 6, 2017

(54) DYNAMIC ZONE-BASED CLOUD MANAGEMENT

(71) Applicant: Verizon Patent and Licensing Inc., Arlington, VA (US)

(72) Inventors: Reinhardt C. Riggin, Colorado Springs, CO (US); Wanda S. Perrier, Diamondhead, MS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/482,825

(22) Filed: Sep. 10, 2014

(65) Prior Publication Data
US 2016/0070597 A1   Mar. 10, 2016

(51) Int. Cl.
*G06F 9/455* (2006.01)
*G06F 9/50* (2006.01)

(52) U.S. Cl.
CPC ........ *G06F 9/5011* (2013.01); *G06F 9/45558* (2013.01); *G06F 2009/45562* (2013.01); *G06F 2009/45579* (2013.01); *G06F 2009/45595* (2013.01)

(58) Field of Classification Search
CPC ............... G06F 9/5011; G06F 9/45558; G06F 2009/45595
See application file for complete search history.

(56) References Cited

U.S. PATENT DOCUMENTS

| | | | | |
|---|---|---|---|---|
| 2009/0300607 A1* | 12/2009 | Ferris | .................. | G06F 9/45558 718/1 |
| 2012/0117241 A1* | 5/2012 | Witt | ....................... | G06F 17/30 709/226 |
| 2012/0278430 A1* | 11/2012 | Lehane | ............... | H04L 41/5054 709/217 |
| 2013/0219390 A1* | 8/2013 | Lee | .......................... | G06F 9/455 718/1 |
| 2014/0215259 A1* | 7/2014 | Crabtree, Jr. | ......... | G06F 11/202 714/4.11 |
| 2015/0242801 A1* | 8/2015 | Cudak | .............. | G06Q 10/06393 705/7.19 |

* cited by examiner

*Primary Examiner* — H S Sough
*Assistant Examiner* — Carina Yun (57) ABSTRACT

A system may be configured to allow for the specification of parameters for a desired virtual machine. The parameters may be provided in an arbitrary fashion (e.g., as opposed to the selection of pre-configured parameters). The system may cause the virtual machine to be provisioned, as a zone, on a physical machine and/or on a logical domain ("LDOM") of a cloud system. The arbitrary fashion of the specification of the virtual machine may allow for enhanced flexibility based on users' needs, and the use of zone-based virtualization may enhance the efficiency of cloud-based virtual machine provisioning.

20 Claims, 8 Drawing Sheets

DYNAMIC ZONE-BASED CLOUD MANAGEMENT

BACKGROUND

"Cloud computing" may refer to technologies in which hardware computing resources (such as processor resources, file system resources, memory resources, etc.) are virtualized, and the virtualized resources provided to users as "virtual machines." A virtual machine may be created as a logical domain ("LDOM"), for which discrete computing resources of one or more physical machines may be dedicated. In the cloud computing context, resources of multiple physical machines may be abstracted and represented as one virtual machine, such as an LDOM. In another virtualization methodology, a virtual machine may be created as a "zone." Multiple zones may be created by a single operating system installed on a single physical machine, and the resources, of the physical machine, provided to each zone may be dynamically managed by the operating system. Ordinarily, when a user requests the provisioning of a virtual machine in a cloud computing environment, the user is presented with pre-generated templates, from which a particular configuration (sometimes referred to as an "image") can be selected and installed on an LDOM.

DETAILED DESCRIPTION OF PREFERRED EMBODIMENTS

The following detailed description refers to the accompanying drawings. The same reference numbers in different drawings may identify the same or similar elements.

In a cloud computing architecture, resources (such as processor resources, file system resources, memory resources, etc.) of one set of physical machines may be "pooled" and presented as a set of virtual machines. For example, a user may request the creation of a virtual machine having certain parameters (such as parameters relating to processor resources, file system resources, memory resources, etc.), and a provisioning system may provision the requested virtual machine from a pooled set of hardware resources (e.g., hardware resources of one or multiple physical machines).

Typically, the virtual machines are provisioned using the LDOM methodology, in which physical resources are dedicated for particular virtual machines. Since the resources, for a particular virtual machine, are "dedicated" to that virtual machine under the LDOM methodology, those resources may not be allocated for use by (or "shared with") other LDOMs, which may result in inefficiencies (such as when the resources are idle). Due to these inefficiencies, resources may be unnecessarily wasted, thus increasing costs for customers and/or for providers.

Furthermore, LDOM-based cloud provisioning is typically relatively inflexible. Ordinarily, a user is given the option of selecting from pre-configured parameters, such as a pre-configured amount of processor resources, a pre-configured amount of file system resources, etc. The parameters are usually stored as "images" by a provisioning system, and installed on LDOMs on demand. If a user's preferred configuration is not available, then the user may need to select a configuration that may not be optimal (e.g., costs more than the user's preferred configuration, and/or is associated with lower performing parameters).

Some implementations, described herein, may allow for the dynamic creation of virtual machines according to custom user-specified parameters. The custom parameters may be set in an open-ended manner, as opposed to selected from a pre-generated list of configurations. Furthermore, some implementations may make use of zone-based virtual machine creation, thereby enhancing the efficient use of hardware resources, and reducing costs for service providers and/or customers.

Figure 1A:
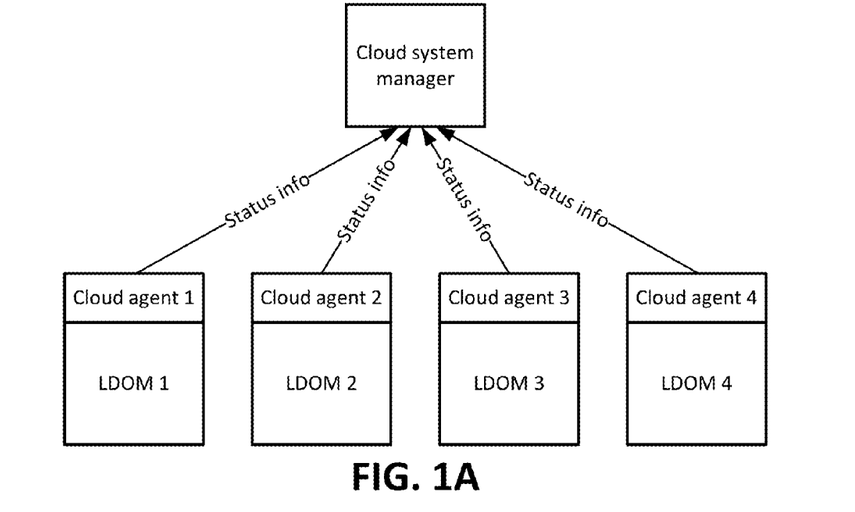
FIGS. 1A and 1B illustrate an example overview of implementations described herein.
Figure 1B:
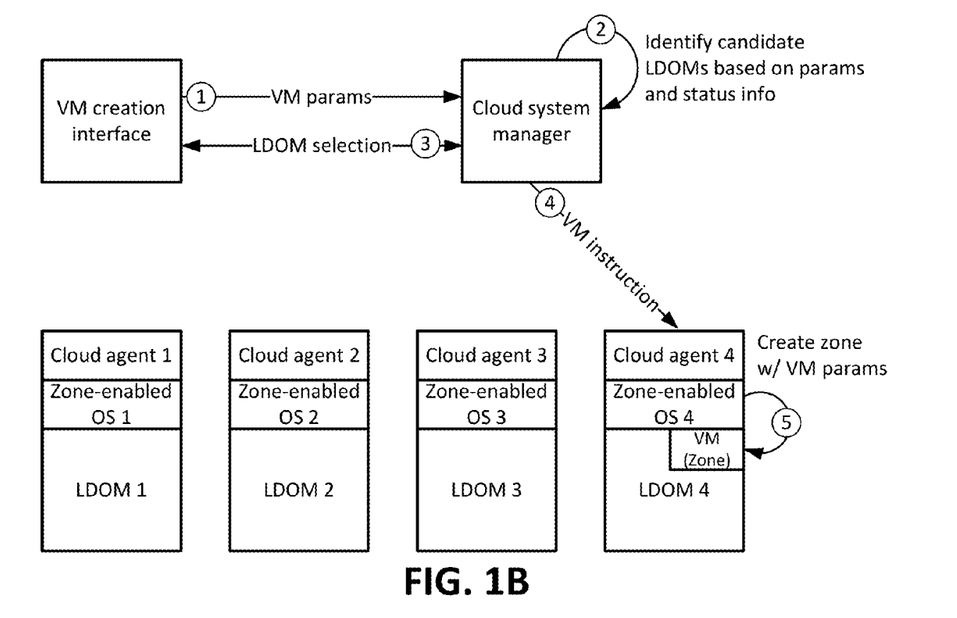

FIGS. 1A and 1B illustrate an example overview of implementations described herein. As shown in FIG. 1A, multiple LDOMs ("LDOM 1" through "LDOM 4") may be present in a cloud system. Each LDOM may represent a discrete set of computing resources. For example, a particular LDOM may be the "bare metal" of a single physical machine, may be a dedicated set of resources associated with a single physical machine, or may be a dedicated set of resources associated with multiple physical machines. Each LDOM may be associated with a cloud agent (e.g., "Cloud agent 1" may be associated with LDOM 1, "Cloud agent 2" may be associated with LDOM 2, and so on). The cloud agent may, for example, be a software application that communicates with a cloud system manager and with a respective LDOM. For instance, a particular cloud agent may collect status information regarding a respective LDOM, and may report the status information to the cloud system manager.

As described in more detail below, the status information may generally indicate parameters associated with the LDOM, such as the availability of resources of the LDOM. The cloud agents may continuously or periodically monitor the LDOM (e.g., by communicating with an operating system installed on the LDOM), in order to collect the status information. The cloud agents may report the status information to the cloud system manager on an ongoing basis (e.g., every fifteen minutes, whenever there is a change to the status information, etc.). In this manner, the cloud system manager may maintain an up-to-date view of the resource availability of the LDOMs.

Referring to FIG. 1B, a virtual machine ("VM") creation interface may be presented (e.g., as a web page). Examples of the VM creation interface are described in more detail below. Briefly, a user may access the VM creation interface to input parameters for a desired virtual machine ("VM params"). The VM creation interface may provide (at arrow 1) the desired parameters to the cloud system manager. The cloud system manager may compare the parameters to previously received status information (e.g., as described above with respect to FIG. 1A), in order to identify (at arrow 2) candidate LDOMs which may be able to host a virtual machine with the desired parameters. For example, the desired parameters may indicate a desired amount of processor resources, file system resources, and memory resources, and the cloud system manager may determine which (if any) LDOMs have the available resources to host the desired virtual machine.

The cloud system manager may present (e.g., via the VM creation interface, at arrow 3) information identifying the identified LDOMs, and may allow the user to select a particular LDOM. The user may select the LDOM based on information associated with the LDOM, such as a physical location of the LDOM and/or a maintenance schedule associated with the LDOM (e.g., times at which the LDOM, and therefore the virtual machine may not be available, due to maintenance being performed on physical hardware associated with the LDOM).

As further shown, the cloud system manager may send a virtual machine creation instruction ("VM instruction" at arrow 4) to the selected LDOM. For example, as shown, the cloud system manager may send the instruction to a cloud agent installed on a zone-enabled operating system ("OS") associated with the selected LDOM (i.e., LDOM 4, in this example). A "zone-enabled operating system," as referred to herein, may be an operating system that supports the creation and management of zones. As mentioned above, a "zone" may be a virtual machine that shares resources with other zones on the same physical machine or LDOM, wherein the resource sharing is managed by a zone-enabled operating system associated with the physical machine or LDOM.

The VM instruction may include some or all of the parameters specified in the VM creation interface, such as the desired resources for the virtual machine. The cloud agent may communicate with the zone-enabled operating system, to cause the zone-enabled operating system to execute a command to create (at arrow 5) a zone (e.g., a native command provided as part of the zone-enabled operating system). The created zone may correspond to the requested virtual machine, and may have the parameters specified in the VM creation interface. While not shown, other zones may be present on LDOM 4. The various zones may be managed by the zone-enabled operating system, associated with LDOM 4 ("zone-enabled OS 4"), in a manner that efficiently utilizes the resources associated with LDOM 4. Thus, in accordance with implementations described herein, a user may be afforded the opportunity to specify custom virtual machine parameters, and a cloud system may provide requested virtual machines in a manner that maximizes the efficiency of hardware resources. Furthermore, since some implementations make use of a zone-based virtualization methodology on top of an LDOM-based virtualization methodology, various different types of hardware configurations may be used to implement concepts disclosed herein.

Figure 2:
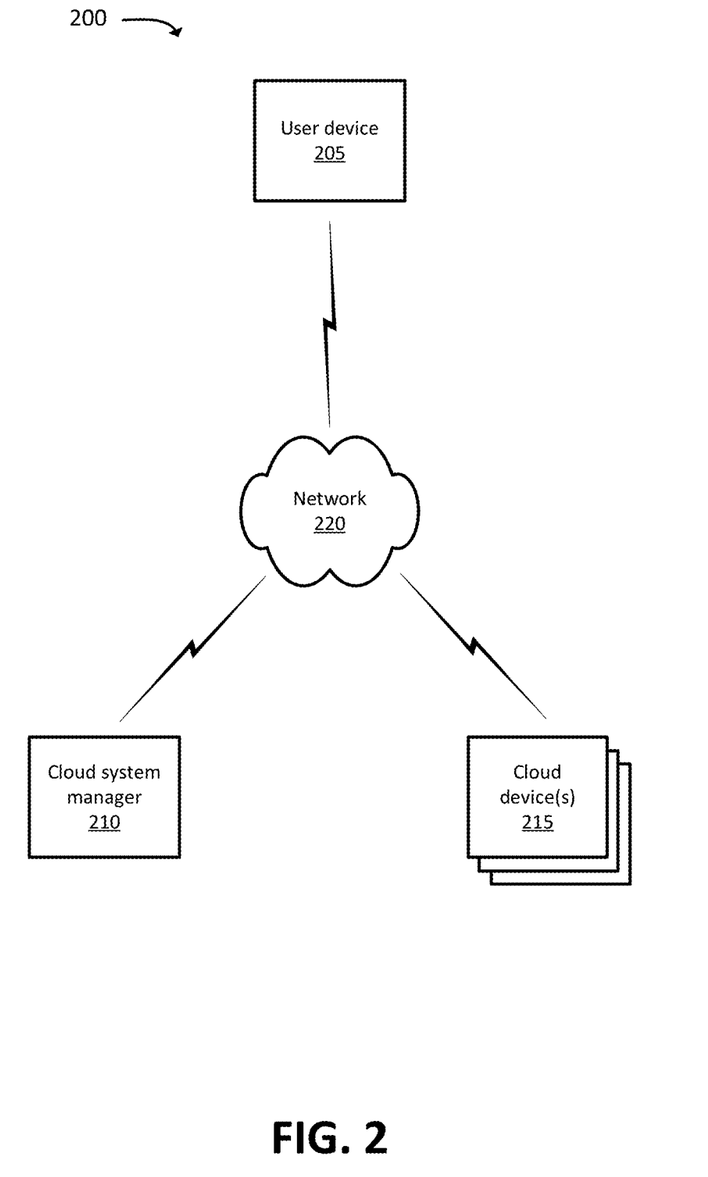
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include user device 205, cloud system manager 210, one or more cloud devices 215 (where a group of cloud devices is sometimes referred to herein as "cloud system 215"), and network 220. The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections.

User device 205 may include any computation and communication device that is capable of communicating with one or more networks (e.g., network 220). For example, user device 205 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 205 may communicate with other devices, such as cloud system manager 210, through network 220. For instance, user device 205 may present, via a display device, a graphical user interface, through which a user may provide custom parameters for a desired virtual machine.

Cloud system manager 210 may include one or more computing devices that manage the dynamic creation of customized virtual machines, based on custom parameters provided by a user (e.g., via user device 205). For example, cloud system manager 210 may include one or more server devices, such as a web server device, that provide a graphical user interface (e.g., via a web page) to user device 205. As described in greater detail below (e.g., with respect to FIG. 3), cloud system manager 210 may also perform functions related to the collection of status information regarding one or more cloud devices 215, and the dynamic provisioning of virtual machines, in accordance with custom parameters provided by users, based on the collected status information. In accordance with some implementations, the virtual machines, provisioned on behalf of users and based on custom parameters, may be provisioned as zones on one or more cloud devices 215. For instance, as described in further detail below, a particular zone may be provisioned on an LDOM that is made up of resources of multiple physical machines.

Cloud devices 215 may include one or more computing devices, such as server devices, on which virtual machines may be provisioned and accessed by users, such as users of one or more user devices 205. As described further below (e.g., with respect to FIGS. 4-7), cloud devices 215 may include one or more physical devices, of which resources (e.g., processing resources, file system resources (also sometimes referred to as "hard drive space"), memory resources (also sometimes referred to as random access memory ("RAM")), etc.) may be provisioned into discrete virtual machines (e.g., LDOMs). For instance, one LDOM may be provisioned on a one-to-one basis with a physical device, multiple LDOMs may be provisioned on a single multiple device, and/or one LDOM may be provisioned using the resources of multiple physical devices.

Network 220 may include one or more networks, via which user device 205, cloud system manager 210, and/or cloud system 215 may communicate. For example, network 220 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an eNodeB ("eNB"), via which user device 205 and/or another device may communicate with the EPC network. The EPC network may include one or more serving gateways ("SGWs"), mobility management entities ("MMEs"), and/or packet data network ("PDN") gateways ("PGWs"), and may enable user device 205 to communicate with a PDN (e.g., the Internet) and/or an IP Multimedia Subsystem ("IMS") core network. The IMS core network may manage authentication, session initiation, account information, a user profile, etc. associated with user device 205.

Network 220 may additionally, or alternatively, include a wide area network ("WAN"), a metropolitan area network ("MAN"), the Internet, a fiber optic-based network, and/or a combination of these or other types of networks. Network 220 may include one or more wireless networks in addition to, or in lieu of, an LTE network. For example, network 220 may include a Code Division Multiple Access ("CDMA") 2000 1× network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11-based standard), and/or another wireless network. In some implementations, network 220 may be communicatively coupled to one or more other networks.

Figure 3:
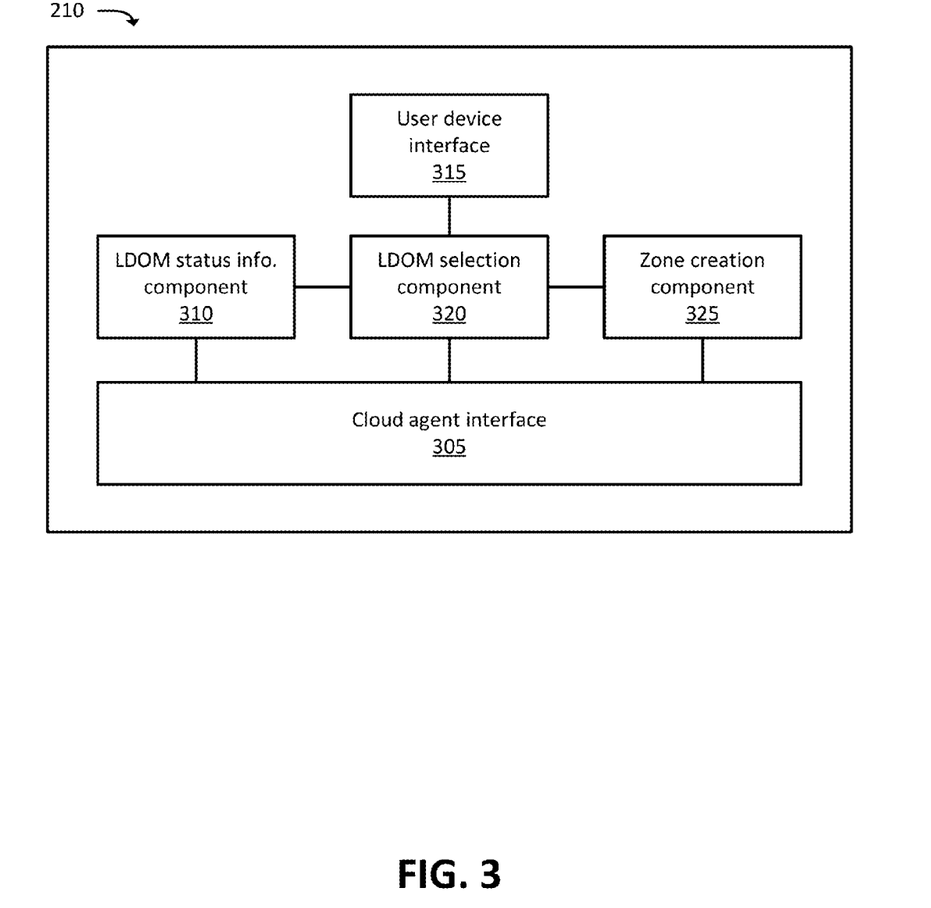
FIG. 3 illustrates example functional components of a cloud system manager, in accordance with some implementations described herein.

FIG. 3 illustrates example functional components of cloud system manager 210, in accordance with some implementations. As shown, cloud system manager 210 may include cloud agent interface 305, LDOM status information component 310, user device interface 315, LDOM selection component 320, and zone creation component 325. These components may be implemented via hardware circuitry, software logic, and/or a combination of hardware and/or software associated with cloud system manager 210. In some implementations, cloud system manager 210 may include additional, fewer, different, and/or differently arranged component. Furthermore, some, or all, of the functionality of one or more components may be performed by one or more other components.

Cloud agent interface 305 may serve as an interface between cloud system manager 210 and one or more cloud agents. Cloud agent interface 305 may include an implementation of an application programming interface ("API"), and/or another type of interface. As mentioned above, and as further described below, a cloud agent may be installed on one or more cloud devices 215 (e.g., one cloud agent for each LDOM associated with cloud system 215). Via cloud agent interface 305, cloud system manager 210 may receive status information regarding LDOMs associated with cloud system 215 and/or output instructions regarding the creation of virtual machines on cloud system 215.

LDOM status information component 310 may receive and/or store status information regarding one or more LDOMs, associated with cloud system 215, via cloud agent interface 305. LDOM status information component 310 may, in some implementations, receive the LDOM status information on an asynchronous basis (e.g., status information for one LDOM may be received at times that are independent of times at which status information for another LDOM are received). In some implementations, LDOM status information component 310 may request the LDOM status information (e.g., via cloud agent interface 305), while in some implementations, the LDOM status information may be "pushed" to LDOM status information component 310 (e.g., a cloud agent may provide LDOM status information to LDOM status information component 310 without a specific request for the LDOM status information).

As mentioned above, the LDOM status information, for a particular LDOM, may generally indicate the resource availability of a particular LDOM. For example, the LDOM status information may indicate an amount and/or type of available processor resources (e.g., quantity of total and/or available processors and/or processor cores, processor clock speeds, processor types, processor architecture), an amount of total and/or available file system resources (e.g., quantity of bytes ("B"), kilobytes ("KB"), megabytes ("MB"), gigabytes ("GB"), terabytes ("TB"), or another measure of available file system resources), a type of file system resources (e.g., a network attached storage ("NAS"), a storage area network ("SAN"), quantity and/or type of physical disks (e.g., hard disks, rotational speeds of hard disks, solid state drives ("SSDs"), hybrid drives), etc.), an amount of total and/or available memory resources (e.g., quantity of B, KB, MB, GB, etc.), and/or a type of memory resources (e.g., a type of memory module, such as a dual in-line memory module ("DIMM")). The status information may additionally, or alternatively, include other types of information, such as identifying information and/or address information for a particular LDOM (e.g., an IP address, domain name system ("DNS") information, a host name, a serial number, an identification with a subnet of which the LDOM is associated, etc.), an identification of an operating system installed on the LDOM, a priority (which may be used to determine which LDOMs are more likely to have new zones allocated to them during virtual machine provisioning), maintenance schedule information (e.g., times at which a particular LDOM may be unavailable for use due to maintenance being performed on the LDOM or a physical device associated with the LDOM), availability status of the LDOM (e.g., whether the LDOM is operational and/or available to provision zones on), or other information.

The status information may additionally, or alternatively, include parameters regarding zones presently allocated on a particular LDOM. For example, the status information may indicate a quantity of zones presently allocated on the LDOM (including zones that are not presently active), names of the zones, IP addresses of the zones, dates on which the zones were created, zone duration (e.g., an amount of time for which the zone is allocated, after which the zone may be torn down), or other zone-related information. As described below, some or all of the LDOM status information may be used by LDOM selection component 320 when handling user requests to establish new virtual machines.

User device interface 315 may include an interface, via which cloud system manager 210 may communicate with one or more user devices 205. For example, cloud system manager 210 may present, via user device interface 315, a VM creation interface, via which cloud system manager 210 may provide parameters for a desired virtual machine. The VM creation interface may be represented as a visual interface, such as a web page. An example VM creation interface, in accordance with some implementations, is described in further detail below with respect to FIG. 8.

LDOM selection component 320 may select an LDOM (e.g., an LDOM associated with cloud system 215) on which to provision a requested virtual machine. For example, LDOM selection component 320 may receive LDOM status information from LDOM status information component 310 and parameters for a desired virtual machine from user device interface 315, and may determine an appropriate candidate LDOM to host the desired virtual machine. For example, LDOM selection component 320 may identify a particular LDOM that has available processor, file system, and/or memory resources to host a virtual machine based on a requested amount of processor, file system, and/or memory resources specified by a user.

Zone creation component 325 may provide instructions (e.g., via cloud agent interface 305) to a cloud agent of a selected LDOM (e.g., as selected by LDOM selection component 320) and/or to an operating system of a selected LDOM, to create a virtual machine. The virtual machine creation instructions may be, for example, instructions to cause the operating system of the selected LDOM to create a zone based on the user-specified parameters.

Figure 4:
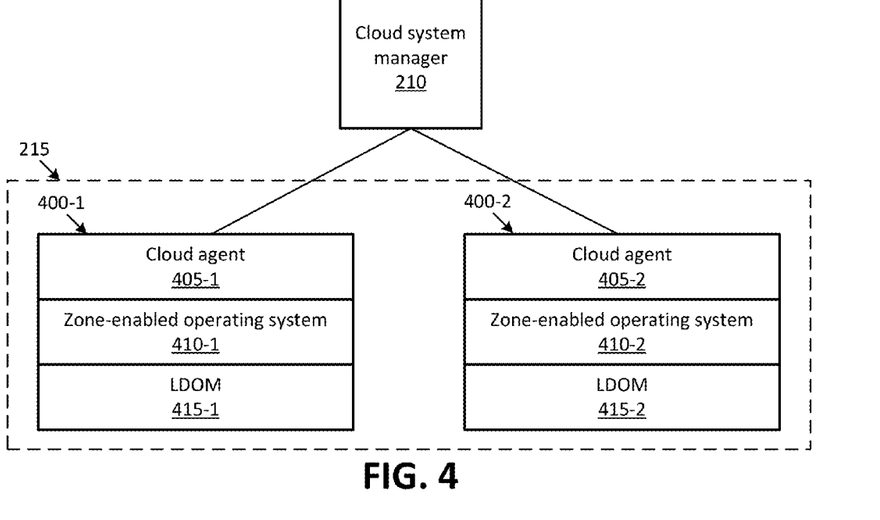
FIGS. 4-7 illustrate alternate views of portions of the example environment shown in FIG. 2.

FIGS. 4-7 illustrate example arrangements of portions of environment 200, discussed above with respect to FIG. 2. For example, FIGS. 4-7 illustrate example arrangements of cloud system manager 210 and cloud system 215, in accordance with some implementations. Referring to FIG. 4, cloud system 215 may include two example physical devices 400-1 and 400-2. Physical devices 400-1 and 400-2 may be physically separate (such as geographically distinct) devices, such as separate server devices, separate rack-mounted blade devices, etc. As shown, physical device 400-1 may include a number of functional components, such as cloud agent 405-1, zone-enabled operating system 410-1, and LDOM 415-1. Physical device 400-2 may include cloud agent 405-2, zone-enabled operating system 410-2, and LDOM 415-2. Items referenced with a dashed-numeral (such as cloud agent 405-1) may sometimes be generally referred to herein without a dash (e.g., individually as "cloud agent 405" or collectively as "cloud agents 405").

In the example shown in FIG. 4, each physical device 400 may be associated with one LDOM 415. For instance, LDOM 415-1 may correspond to the "bare metal" of physical device 400-1. LDOM 415-1 may, thus in some implementations, not be a virtual machine, but the actual physical resources of physical device 400-1. Zone-enabled operating system 410-1 may be installed on physical device 400-1. For example, zone-enabled operating system 410-1 may manage the physical resources of LDOM 415-1, such as by creating and managing zones on LDOM 415-1. Zone-enabled operating system 410-1 may be an operating system that is capable of creating, modifying, and de-allocating zones on LDOM 415-1. One example of a zone-enabled operating system is the Solaris operating system by the Oracle Corporation.

Cloud agent 405-1 may be installed on physical device 400-1 (e.g., at an application layer above zone-enabled operating system 410-1). As mentioned above, cloud agent 405-1 may communicate with zone-enabled operating system 410-1 and/or LDOM 415-1, in order to collect status information associated with LDOM 415-1. Cloud agent 405-1 may output the status information to cloud system manager 210 on a periodic basis (e.g., every fifteen minutes), and/or on another basis (e.g., whenever a change occurs on LDOM 415-1, such as when a new zone is created or de-allocated). Cloud agent 405-1 may also receive instructions from cloud system manager 210 to create, modify, or de-allocate zones. For example, as discussed above, cloud system manager 210 may receive a request from a user to create a virtual machine having certain parameters, and cloud system manager 210 may output an instruction to a particular cloud agent 405 associated with a selected LDOM 415.

Figure 5:
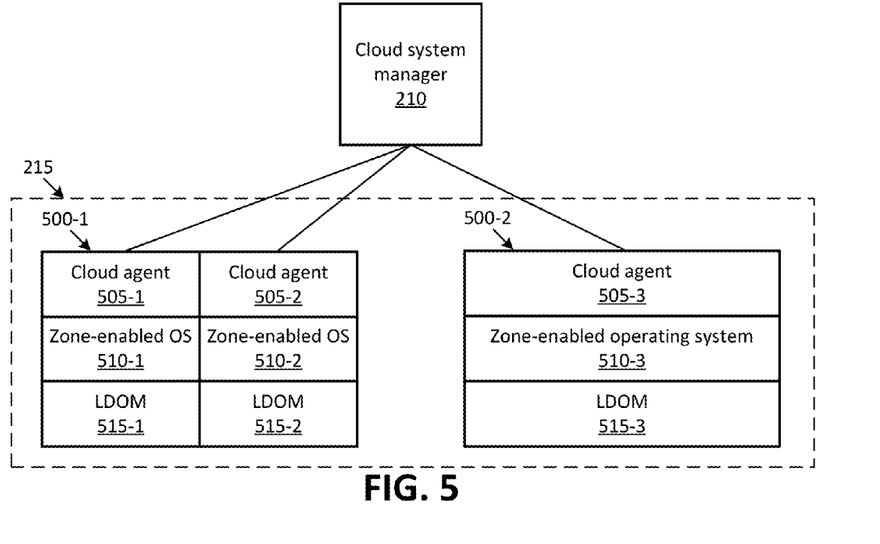

Referring to FIG. 5, cloud system 215 may include physical devices 500-1 and 500-2. While physical device 500-2 may have a similar configuration as discussed above with respect to physical devices 400 (e.g., one LDOM 515-3 residing on physical device 500-2), physical device 500-1 may host multiple LDOMS 515-1 and 515-2. As shown, zone-enabled operating system 510-1 may be installed on LDOM 515-1, and zone-enabled operating system 510-2 may be installed on LDOM 515-2. While not shown, a hypervisor may be installed on physical device 500-1 (e.g., on top of the physical hardware of physical device 500-1), and may serve as an interface between the physical hardware (e.g., between the respective allocated LDOMS 515-1 and 515-2) and zone-enabled operating systems 510-1 and 510-2. Cloud agents 505-1 and 505-2 may be installed on 515-1 and 515-2, respectively (e.g., at an application layer above 510-1 and 510-2). Cloud agent 505-1 may provide status information, regarding LDOM 515-1, to cloud system manager 210, and cloud agent 505-2 may provide status information, regarding LDOM 515-2, to cloud system manager 210. Cloud agent 505-1 may also receive zone creation instructions from cloud system manager 210, and may provide the zone creation instructions to zone-enabled operating system 510-1, while cloud agent 505-2 may receive zone creation instructions from cloud system manager 210, and may provide the zone creation instructions to zone-enabled operating system 510-2.

Figure 6:
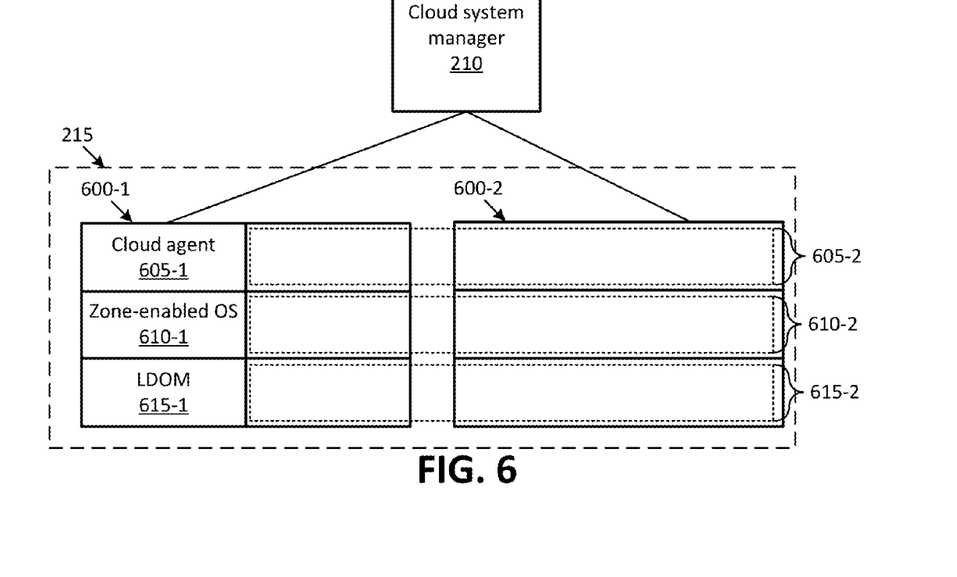

FIG. 6 illustrates an example arrangement, in which one LDOM is associated with resources of multiple physical devices. For example, as shown, LDOM 615-2 may be made up of resources of physical devices 600-1 and 600-2, and cloud agent 605-2 and zone-enabled operating system 610-2 may be installed on LDOM 615-2. While not shown, an external cloud management device and/or logic may provide the capability for the hardware of physical devices 600-1 and 600-2 to be pooled and used as a single LDOM 615-2.

As also shown in FIG. 6, physical device 600-1 may be associated with another LDOM (i.e., LDOM 615-1, along with corresponding zone-enabled operating system 610-1 and cloud agent 605-1). Thus, the physical resources of physical device 600-1 may be allocated to LDOM 615-1 and may also be a part of the physical resources allocated to LDOM 615-2 (the other portion of LDOM 615-2 being provided by physical device 600-2).

Figure 7:
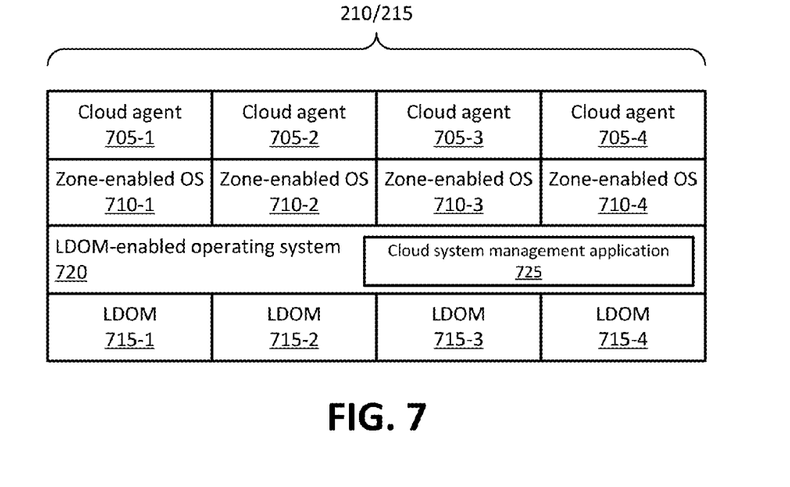

FIG. 7 illustrates yet another possible arrangement of cloud system manager 210 and cloud system 215. In some implementations, cloud system manager 210 and cloud system 215 may be provided on a single physical device. As shown, the single physical device may host multiple LDOMs 715-1 through 715-4 (each with a corresponding zone-enabled operating system 710 and cloud agent 705). The physical device may also include LDOM-enabled operating system 720, which may serve as a hypervisor. For example, LDOM-enabled operating system 720 may manage the physical resources of the physical device, and may allocate particular physical resources to each respective LDOM 715. Cloud system management application 725 (e.g., an application that performs some or all of the above-described functionality associated with cloud system manager 210) may be installed on LDOM-enabled operating system 720. Cloud agents 705 may communicate with cloud system management application 725 via proprietary protocols, via an external network (e.g., a socket between cloud agent 705 and cloud system management application 725), and/or via other techniques.

While certain example arrangements and/or configurations of cloud system manager 210 and cloud system 215 were described above with respect to FIGS. 4-7, in practice, cloud system manager 210 and/or cloud system 215 may be arranged and/or configured in other ways. For example, combinations of the configurations shown in one or more of FIGS. 4-7 may be used in practice. Further, cloud system manager 210 and/or cloud system 215 may include additional, fewer, different, and/or differently arranged devices than shown in FIGS. 4-7. For example, cloud system manager 210 may be implemented by a single physical device, or may be implemented on a distributed virtual machine.

Figure 8:
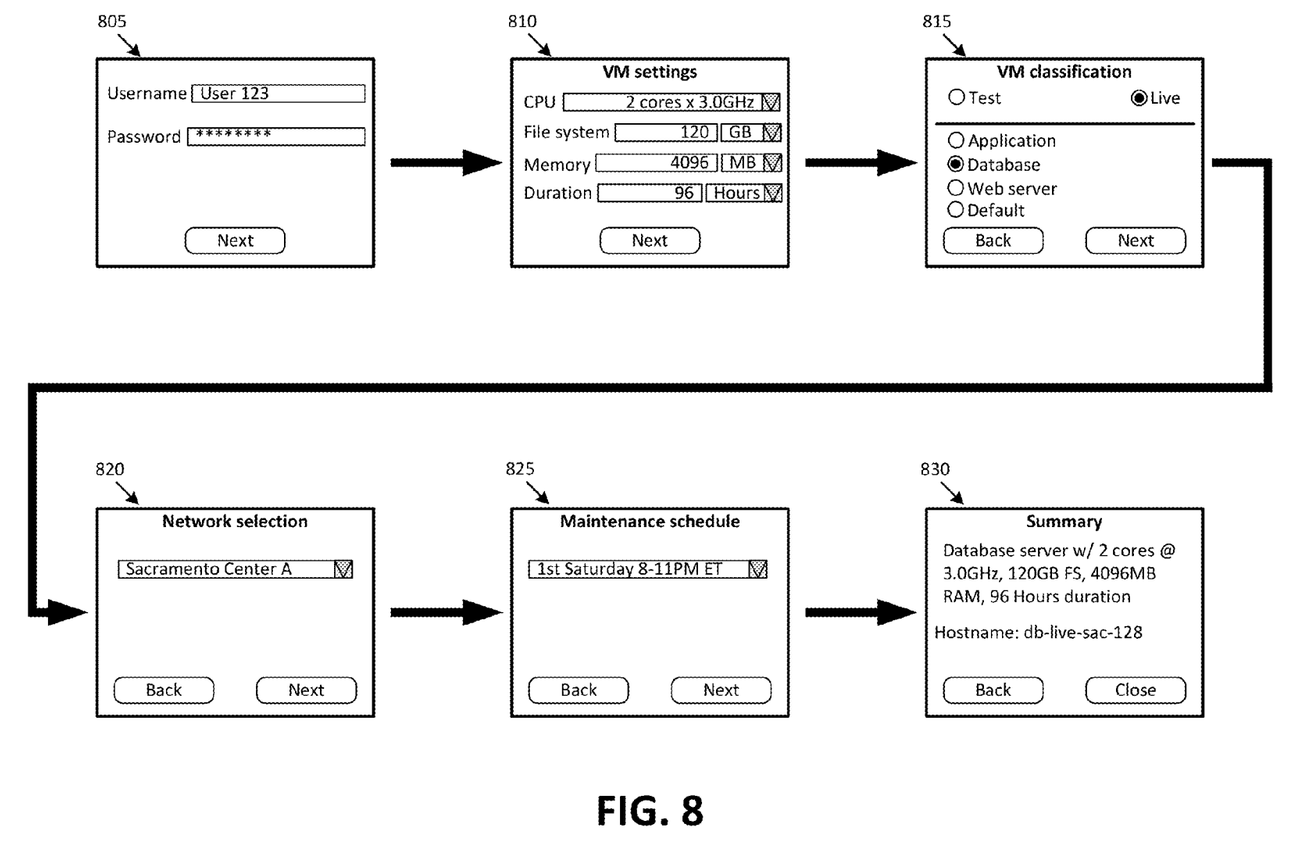
FIG. 8 illustrates user interfaces that may be associated with the configuration and creation of a virtual machine based on custom user-specified parameters.

FIG. 8 illustrates example user interfaces 805-830, which may correspond to a VM creation interface (e.g., as provided by cloud system manager 210), in accordance with some implementations. For example, as discussed above, user interfaces 805-830 may be presented via a web page or another format, and a user may provide parameters for a desired virtual machine via user interfaces 805-830.

As shown, user interface 805 may include fields to allow a user to enter identifying and/or authentication information, such as a username and a password. The information, provided via user interface 805, may be used by cloud system manager 210 to verify that a particular user has access to request the creation of a virtual machine. In some implementations, the user may be a technician associated with an entity that owns and/or operates cloud system manager 210, while in some implementations, the user may be an end user (e.g., an end user who wishes to use a virtual machine provisioned using techniques described herein).

User interface 810 may allow for the specification of desired parameters for the virtual machine. For example, user interface 810 may allow for the specification of an amount of processor ("CPU") resources, file system resources, memory resources, and/or a duration of the virtual machine. For example, user interface 810 may include graphical elements such as a list boxes, combo boxes, and/or text fields. In list boxes and/or combo boxes, pre-populated options may be provided. For example, cloud system manager 210 may identify "popular" configurations (e.g., based on configurations that have been more commonly selected in the past by one or more other users, than other possible configurations).

As another example, the list boxes and/or combo boxes may include a range of parameters, in which a maximum range is specified. For example, a list box that provides possible processor configuration options may indicate a maximum amount of allowed processor resources (e.g., as specified by an administrator, and/or based on a maximum capability of LDOMs associated with cloud system 215, which may be determined based on received LDOM status information).

Additionally, or alternatively, combo boxes and/or text fields may allow for the specification of a parameter in an arbitrary manner. For example, combo boxes and/or text fields may allow for the free entry of any arbitrary value (e.g., a user may enter a value using a keyboard, where the value is not a pre-configured value provided in the user interface). For instance, while a combo box may include pre-populated configuration options, the combo box may still allow for the free entry of arbitrary values by a user. In the example shown in FIG. 8, user interface 810 may include a combo box for processor parameters. Further, in this example, user interface 810 may also include a text field and a list box for file system parameters, memory parameters, and the duration parameter. For example, the file system parameter may be specified via an arbitrary value entered in the text field, and a unit selected from the list box (e.g., B, KB, MB, GB, TB, etc.). As mentioned above, providing arbitrary values may have advantages over systems in which only pre-configured values are provided (e.g., pre-configured values that correspond to "images" of virtual machines), such as additional flexibility for the user.

The processor parameter may specify a quantity of cores, type, and/or clock speed of desired processing resources for the virtual machine. For example, as shown, a user may specify that two cores are desired at a speed of 3.0 GHz. The file system parameter may specify an amount of storage space desired for the virtual machine. Although not shown, the file system parameter may additionally, or alternatively, in some implementations, specify a desired file system performance (e.g., read speed, write speed, etc.). The memory parameter may specify an amount of memory, or RAM, desired for the virtual machine. The duration parameter may specify an amount of time for which the user desires the virtual machine to be provisioned. For example, the user may specify a number of days, hours, weeks, etc., that the virtual machine should be provisioned. After the expiration of the specified time, the virtual machine may be torn down (e.g., based on an instruction provided by cloud system manager 210 at the time the virtual machine expires, and/or based on an expiration time or date specified by cloud system manager 210 at the time of virtual machine creation).

User interface 815 may allow for the classification of the desired virtual machine. The classification may be used by cloud system manager 210 to identify candidate LDOMs, of cloud system 215, which may potentially host the desired virtual machine. For example, one set of LDOMs, and/or physical machines of cloud system 215, may be "test" machines, while other LDOMs or physical devices may be "live" machines. Test machines may be, for example, machines that are not generally publicly accessible. For instance, test machines may have authentication procedures that are more stringent than live machines. In some implementations, test machines may only be accessible via certain networks (such as private or enterprise networks), while live machines may be accessible via public networks (such as the Internet).

As also shown, another set of classification options (e.g., potential usages for the virtual machine) may be presented in user interface 815. For example, the potential usage classification options may include "Application," "Database," "Web server," and "Default." In practice, additional, fewer, or different options may be presented. These classification options may relate to types of hardware, associated with LDOMs of cloud system 215, that are suited to particular types of uses. For example, a "Web server" classification may be well-suited to LDOMs with one particular hard drive configuration, while a "Database" classification may be well-suited to LDOMs with another hard drive configuration. When selecting candidate LDOMs (e.g., based on classifications specified via user interface 815 and/or parameters specified via user interface 810), cloud system manager 210 may evaluate LDOM status information received from LDOMs, in order to determine which LDOMs are best suited for the particular classification(s) and/or parameters (e.g., have available resources).

While two sets of classifications are shown in user interface 815, in practice, additional, fewer, and/or different sets of classifications may be shown. Further, while the classifications are shown as sets of radio buttons (e.g., one set of radio buttons for the "Test" and "Live" classifications and another set of radio buttons for the "Application," "Database," "Web server," and "Default" classifications), in some implementations, other graphical elements may be used for classification selection.

In some implementations, classifications may be used to provide further customization options. For example, while not shown in the figure, the selection of an "Application," "Database," or "Web server" may cause another user interface to be displayed, which may present a catalog of relevant applications to be installed on the virtual machine. For example, the "Application" classification may be associated with application platforms that are capable of running applications designed for those platforms, such as a Java platform that is capable of running Java applications. As another example, a "Database" classification may be associated with a catalog of database-related applications, while a "Web server" classification may be associated with web server-related applications.

User interface 820 may allow for the selection of a network, subnet, and/or other group or cluster (hereinafter referred to simply as "cluster," for the sake of brevity) of LDOMs to host the virtual machine. For example, a list of candidate clusters may be presented via a list box in user interface 820. Additionally, or alternatively, individual candidate LDOMs may be listed in user interface 820. The candidate clusters may indicate clusters in which one or more LDOMs may be suitable candidates for the requested virtual machine. As mentioned above, a suitable candidate LDOM may be an LDOM with available resources (e.g., as compared to requested parameters specified via user interface 810) and suitable hardware configurations (e.g., as compared to classifications specified via user interface 815). Cloud system manager 210 may, in some implementations, rank the clusters according to various factors, such as measures of performance (e.g., network performance, such as latency, throughput, etc.), or other factors (e.g., geographical distance from user device 205). A user may additionally, or alternatively, select a particular cluster based on the provided ranking, and/or another factor, as the user sees fit. In some implementations, the user may be allowed to select multiple clusters. In the case where the user selects multiple clusters, cloud system manager 210 may select a particular cluster or LDOM out of the multiple selected clusters. In some implementations, information regarding multiple clusters may be used to further refine the selection of an LDOM to host the virtual machine (e.g., as described below with respect to user interface 825).

User interface 825 may allow for the user to select a maintenance schedule for the virtual machine. For example, user interface 825 may include a list box that includes maintenance schedules associated with the candidate cluster (e.g., maintenance schedules of LDOMs within the cluster; or, in the situation where the user selects multiple clusters, maintenance schedules of LDOMs within the multiple clusters). The maintenance schedules may be determined based on, for example, information provided via LDOM status information. For instance, one set of LDOMs (in the selected cluster) may be associated with one maintenance schedule, while another set of LDOMs (in the selected cluster) may be associated with a different maintenance schedule. As mentioned above, a maintenance schedule may indicate scheduled times at which an LDOM may be unavailable. The user may select a maintenance schedule, and cloud system manager 210 may finalize the selection of the LDOM to host the virtual machine. Once the LDOM has been selected by cloud system manager 210, cloud system manager 210 may, as described above, output an instruction to the LDOM to create the virtual machine. The instruction may cause the LDOM to create a zone that corresponds to the parameters in interfaces 810 and/or 815.

User interface 830 may include a summary of the created virtual machine. For example, the summary may indicate the parameters (provided via user interface 810), the classification(s) (provided via user interface 815), and the maintenance schedule (selected at user interface 825). The summary may also indicate a hostname of the created virtual machine, which may be generated based on the various parameters indicated in interfaces 810-825. For instance, in the example hostname "db-live-sac-128," shown in FIG. 8, "db" may refer to the "Database" classification, "live" may refer to the "Live" classification, "saca" may refer to the selected cluster ("Sacramento Center A" in user interface 820), and "128" may be another identifier assigned to the virtual machine (e.g., to differentiate between other potential virtual machines having similar hostnames).

In some implementations, cloud system manager 210 may install (e.g., using an automated installation technique) one or more applications on the virtual machine, which may allow the user to communicate with the virtual machine. For example, an installed management application may serve as an interface between the operating system and an external network (e.g., the Internet, a private enterprise network, etc.). Via the management application, the user may input commands to the operating system of the virtual machine, such as commands to install and/or run applications, and/or perform other functionality provided by the operating system. The management application may allow the user to act as an administrator of the operating system of the newly-provisioned virtual machine (e.g., the zone allocated on the selected LDOM). Additionally, or alternatively, cloud system manager 210 may install applications based on classification information (e.g., as provided via user interface 815). For instance, for a "Database" classification, cloud system manager 210 may install common database applications and/or database applications that have been specified by the user.

Figure 9:
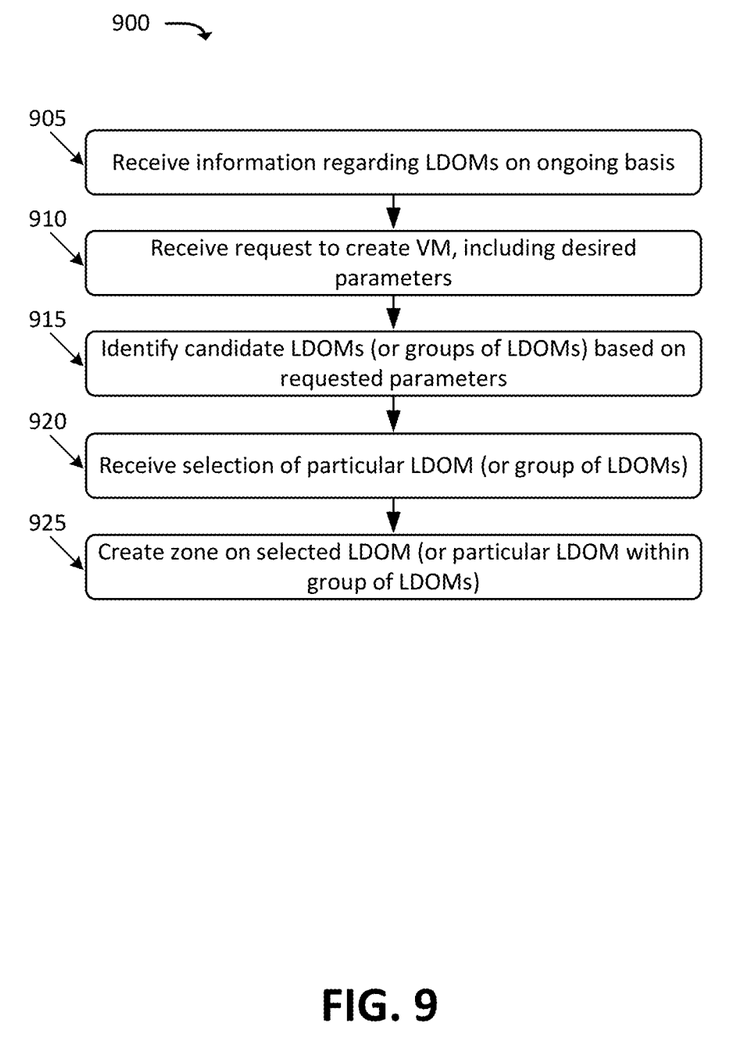
FIG. 9 illustrates an example process for configuring and creating a virtual machine based on custom user-specified parameters.

FIG. 9 illustrates an example process 900 for creating a custom virtual machine based on user-specified parameters. Process 900 may, in some implementations, be performed by cloud system manager 210. In other implementations, some or all of process 900 may be performed by one or more other devices.

Process 900 may include receiving (at 905) status information regarding a set of LDOMs on an ongoing basis. For example, as discussed above with respect to LDOM status information component 310, cloud system manager 210 may receive status information from LDOMs, of user device 205, on an ongoing basis. For instance, cloud agents, installed on the LDOMs of user device 205, may "push" the status information to cloud system manager 210 on a periodic and/or intermittent basis. As also mentioned above, the status information may be provided in an asynchronous manner, in which the providing of the status information by one cloud agent is done independently of the providing of status information by another cloud agent. In some implementations, cloud system manager 210 may request status information from one or more LDOMs. As discussed above, the status information for a particular LDOM may include information regarding the usage or availability of resources associated with the particular LDOM, configuration information associated with the particular LDOM, and/or other types of information.

Process 900 may also include receiving (at 910) a request to create a virtual machine, including desired parameters for the virtual machine. For example, as discussed above with respect to LDOM selection component 320 and interfaces 805-815, cloud system manager 210 may receive a request from a user to create a customized virtual machine. The request may include parameters, such as a desired amount and/or type of resources (e.g., processor resources, file system resources, memory resources), a duration of the virtual machine, and/or classification information for the virtual machine.

Process 900 may further include identifying (at 915) a candidate LDOM (or group of LDOMs) based on the requested parameters and the status information. For instance, cloud system manager 210 may identify, based on the status information (received at 905), one or more LDOMs that have the available resources specified in the parameters (received at 910). As mentioned above with respect to user interface 820, cloud system manager 210 may present information regarding the identified one or more LDOMs to the user.

Process 900 may additionally include receiving (at 920) a selection of a particular LDOM (or group of LDOMs) based on the requested parameters. For example, as mentioned above with respect to user interface 820, cloud system manager 210 may receive a selection of a particular LDOM (identified at 915) from a user. Additionally, or alternatively, cloud system manager 210 may select an LDOM (e.g., without receiving a selection from a user). Additionally, or alternatively, as described above with respect to user interface 825, cloud system manager 210 may present additional options, such as maintenance schedule options, which may further influence the selection of an LDOM.

Process 900 may also include creating (at 925) a zone on the selected LDOM (or a particular LDOM within the group of LDOMs). For example, as described above with respect to zone creation component 325, cloud system manager 210 may output an instruction to the selected LDOM (e.g., to a cloud agent associated with the selected LDOM) to create a zone that corresponds to the parameters specified by the user. As mentioned above, zone-based virtualization may allow the LDOM to efficiently manage resources associated with the LDOM. In some implementations, the LDOM may "over-provision resources" associated with the LDOM, and perform scheduling (such as fair share scheduling) in order to provide the provisioned resources to multiple zones.

For example, assume that an LDOM is associated with 3.0 GB of memory resources. The LDOM may "over-provision" the resources to two example zones. For example, the LDOM may provision 2.0 GB of memory resources to a first zone, and 2.0 GB to a second zone. Since the cumulative amount of the provisioned memory resources for these example zones is 4.0 GB (i.e., greater than the 3.0 GB of memory associated with the LDOM), the memory resources of the LDOM may be considered to be "over-provisioned." However, since the LDOMs may not necessarily need full utilization of the provisioned memory resources at all times, the LDOM may use scheduling techniques in order to suitably provide (or approximately provide) the provisioned resources to the LDOMs.

Figure 10:
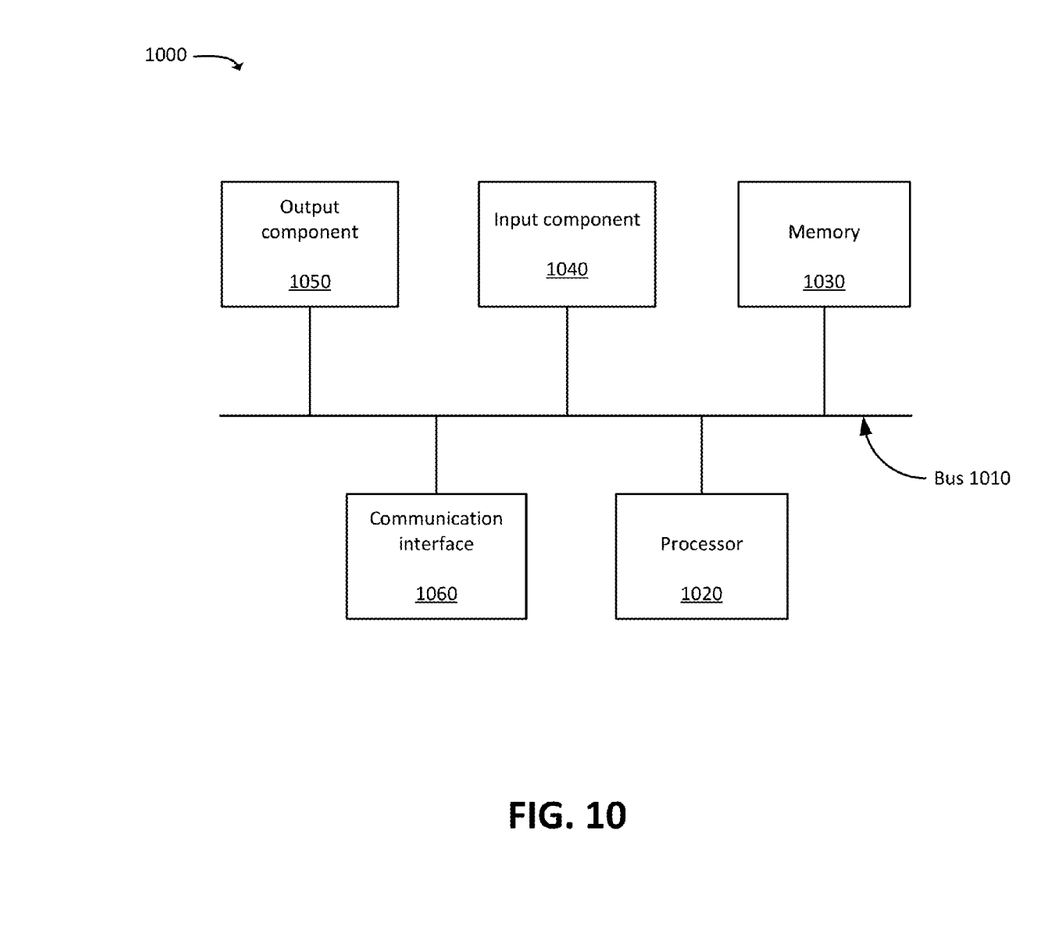
FIG. 10 illustrates example components of a device, in accordance with some implementations described herein.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while a series of blocks has been described with regard to FIG. 9, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms), As used herein, "exceeding" a threshold (or similar terms) may be used interchangeably with "being greater than threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
  receiving, by a cloud management device, a request for a virtual machine, the request including one or more parameters for the requested virtual machine, the one or more parameters including at least one of:
    a first parameter specifying an amount of processor resources for the requested virtual machine,
    a second parameter specifying an amount of file system resources for the requested virtual machine, or
    a third parameter specifying an amount of memory resources for the requested virtual machine,
    wherein at least one of the first parameter, the second parameter, or the third parameter is specified in an arbitrary manner;
  selecting, by the cloud management device, a particular logical domain ("LDOM") out of a plurality of LDOMs associated with a cloud system,
    the particular LDOM being associated with a discrete set of physical resources, of the cloud system, that have been allocated to the particular LDOM and are not available to be allocated to, or shared with, other LDOMs, of the plurality of LDOMs,
    the LDOM further being a virtual machine that has an operating system installed on the LDOM, the operating system being capable of creating and managing zones on the LDOM using a zone-based virtualization technique,
    wherein the zone-based virtualization technique is a virtualization technique in which the operating system, installed on the LDOM, manages sharing of the discrete set of physical resources associated with the LDOM among a plurality of zones that are provisioned on the LDOM, the provisioned zones each being a separate virtual machine,
    the selecting including determining that the particular LDOM has available resources to host the requested virtual machine, the determining being based on a comparison of available resources, of the particular LDOM, to the one or more parameters included in the request; and
  outputting, by the cloud management device and to the LDOM, an instruction to provision the requested virtual machine, the instruction causing the operating system, associated with the LDOM, to create a zone on the LDOM, the created zone being associated with the one or more parameters included in the request.

2. The method of claim 1, further comprising:
  receiving status information regarding the plurality of LDOMs; and
  determining the available resources, of the particular LDOM, based on the received status information.

3. The method of claim 2, wherein the status information, regarding the plurality of LDOMs, is pushed to the cloud management device on a periodic or intermittent basis by respective cloud agent applications associated with the each LDOM, of the plurality of LDOMs.

4. The method of claim 1, wherein one LDOM, of the plurality of LDOMs, includes at least one of:
  physical hardware of a single physical device,
  virtual hardware of a single physical device, or
  virtual hardware of multiple physical devices.

5. The method of claim 1, further comprising:
  receiving classification information for the requested virtual machine,
  wherein selecting the particular LDOM includes:
    determining a preferred hardware type associated with the classification information, and
    comparing the preferred hardware type to a hardware type associated with the particular LDOM.

6. The method of claim 1, wherein selecting the particular LDOM includes:
  identifying, based on the one or more parameters, a set of candidate LDOMs, the set of candidate LDOMs including the particular LDOM,
  presenting information regarding the identified set of candidate LDOMs, the information including maintenance schedule information associated with one or more LDOMs of the identified set of candidate LDOMs, and receiving a selection of the particular LDOM from the identified set of candidate LDOMs.

7. The method of claim 1, wherein the request for the requested virtual machine is received via an interactive user interface that allows a user to provide arbitrary values for at least one of the first parameter, the second parameter, or the third parameter.

8. The method of claim 7, wherein the interactive user interface further allows the user to select pre-set values for at least one of the first parameter, the second parameter, or the third parameter.

9. A cloud management device, comprising:
a memory device storing a set of processor-executable instructions; and
a processor configured to execute the processor-executable instructions, wherein executing the computer-executable instructions causes the processor to:
receive a request for a virtual machine, the request including one or more parameters for the virtual machine, the parameters including at least one of:
a first parameter specifying an amount of processor resources for the requested virtual machine,
a second parameter specifying an amount of file system resources for the requested virtual machine, or
a third parameter specifying an amount of memory resources for the requested virtual machine;
select a particular logical domain ("LDOM") out of a plurality of LDOMs associated with a cloud system, the particular LDOM being associated with a discrete set of physical resources, of the cloud system, that have been allocated to the particular LDOM and are not available to be allocated to, or shared with, other LDOMs, of the plurality of LDOMs,
the LDOM further being a virtual machine that has an operating system installed on the LDOM, the operating system being capable of creating and managing virtual machines on the LDOM using a zone-based virtualization technique,
wherein the zone-based virtualization technique is a virtualization technique in which the operating system, installed on the LDOM, manages sharing of the discrete set of physical resources associated with the LDOM among a plurality of virtual machine zones that are provisioned on the LDOM,
the selecting including determining that the particular LDOM has available resources to host the requested virtual machine, the determining being based on a comparison of available resources, of the particular LDOM, to the one or more parameters included in the request; and
output, to the LDOM, an instruction to provision the requested virtual machine, the instruction causing the operating system, associated with the LDOM, to provision a zone on the LDOM by creating the zone on the LDOM, the provisioned zone being associated with the one or more parameters included in the request.

10. The cloud management device of claim 9, wherein executing the processor-executable instructions further causes the processor to:
receive status information regarding the plurality of LDOMs; and
determine the available resources, of the particular LDOM, based on the received status information.

11. The cloud management device of claim 10, wherein the status information, regarding the plurality of LDOMs, is pushed to the cloud management device on a periodic or intermittent basis by respective cloud agent applications associated with the each LDOM, of the plurality of LDOMs.

12. The cloud management device of claim 9, wherein one LDOM, of the plurality of LDOMs, includes at least one of:
physical hardware of a single physical device,
virtual hardware of a single physical device, or
virtual hardware of multiple physical devices.

13. The cloud management device of claim 9, wherein executing the processor-executable instructions further causes the processor to:
receive classification information for the requested virtual machine,
wherein executing the processor-executable instructions, to select the particular LDOM, further causes the processor to:
determine a preferred hardware type associated with the classification information, and
compare the preferred hardware type to a hardware type associated with the particular LDOM.

14. The cloud management device of claim 9, wherein executing the processor-executable instructions, to select the particular LDOM, further causes the processor to:
identify, based on the one or more parameters, a set of candidate LDOMs, the set of candidate LDOMs including the particular LDOM,
present information regarding the identified set of candidate LDOMs, the information including maintenance schedule information associated with one or more LDOMs of the identified set of candidate LDOMs, and
receive a selection of the particular LDOM from the identified set of candidate LDOMs.

15. The cloud management device of claim 9, wherein the request for the virtual machine is received via an interactive user interface that allows a user to provide arbitrary values for at least one of the first parameter, the second parameter, or the third parameter.

16. The cloud management device of claim 15, wherein the interactive user interface further allows the user to select pre-set values for at least one of the first parameter, the second parameter, or the third parameter.

17. A system, comprising:
a set of cloud devices that implement a plurality of logical domains ("LDOMs"), each LDOM being a virtual machine that is associated with:
a discrete set of physical resources, of the set of cloud devices, that have been allocated to the LDOM and are not available to be shared with other LDOMs, of the plurality of LDOMs,
a zone-enabled operating system installed on the LDOM,
the zone-enabled operating system, for a particular LDOM, being capable of sharing resources of the particular LDOM among a plurality of virtual machine zones provisioned on the particular LDOM, and
a cloud agent that collects and outputs status information regarding the LDOM, the status information including information regarding available resources associated with the LDOM; and
a cloud management device that includes:
a memory device storing processor-executable instructions, and a processor configured to execute processor-executable instructions, wherein executing the processor-executable instructions causes the processor to:
present an interactive user interface that includes free-entry text fields that allow a user to specify a set of arbitrary parameters for a requested virtual machine,
identify a particular LDOM, implemented by at least a subset of the set of cloud devices, that has available resources to host the requested virtual machine,
the identifying being based on comparing received status information, associated with the particular LDOM, to the specified set of arbitrary parameters, and
output an instruction to the identified LDOM to provision the requested virtual machine, the instruction causing the operating system of the identified LDOM to create a zone, on the identified LDOM, that corresponds to the requested virtual machine, the zone being created with the specified set of parameters.

18. The system of claim 17, wherein the specified set of parameters includes at least one of:
a first parameter specifying an amount of processor resources for the requested virtual machine,
a second parameter specifying an amount of file system resources for the requested virtual machine, or
a third parameter specifying an amount of memory resources for the requested virtual machine.

19. The system of claim 17, wherein the user interface further allows the user to select a maintenance schedule for the requested virtual machine, wherein possible options from which the user can select are based on maintenance schedules associated with one or more of the LDOMs.

20. The system of claim 19, wherein the maintenance schedule specifies dates or times during which the requested virtual machine is unavailable.

* * * * *